W. A. MERRALLS.
AIR COOLING APPARATUS.
APPLICATION FILED OCT. 26, 1907.

923,437.

Patented June 1, 1909.

2 SHEETS—SHEET 1.

Witnesses:
Chas. H. Potter.
N. P. Leonard.

Inventor:
William A. Merralls,
by Byrnes & Townsend,
Att'ys

W. A. MERRALLS.
AIR COOLING APPARATUS.
APPLICATION FILED OCT. 26, 1907.
923,437.
Patented June 1, 1909.
2 SHEETS—SHEET 2.
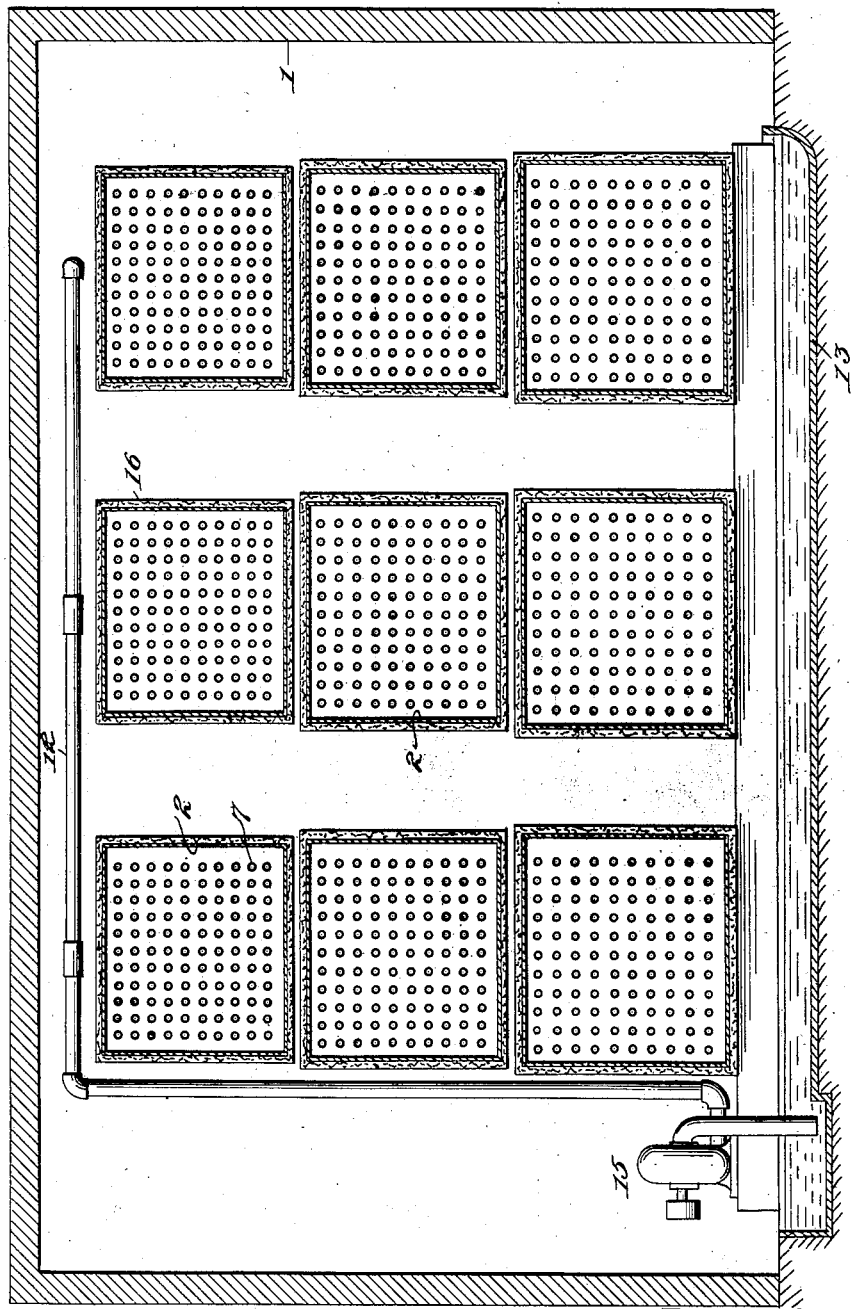

UNITED STATES PATENT OFFICE.

WILLIAM A. MERRALLS, OF SAN FRANCISCO, CALIFORNIA.

AIR-COOLING APPARATUS.

No. 923,437.

Specification of Letters Patent.

Patented June 1, 1909.

Application filed October 26, 1907. Serial No. 399,310.

*To all whom it may concern:*

Be it known that I, WILLIAM A. MERRALLS, a citizen of the United States, residing at San Francisco, in the county of San Francisco and State of California, have invented certain new and useful Improvements in Air-Cooling Apparatus, of which the following is a specification.

The object of this invention is to provide an air-cooling apparatus for dwellings, office buildings and other structures, whereby fresh and cool air may be continuously supplied without the employment of ice or of refrigerating apparatus depending upon the cooling effect of expanding gases.

According to the preferred form of my invention the air is cooled by transferring heat therefrom to a body of liquid, which is in turn cooled by transference of heat to a liquid exposed under conditions for rapid evaporation whereby its heat becomes latent.

In the preferred embodiment of the invention, the apparatus comprises a vessel having an exterior porous covering, means for supplying water to the covering and for directing a current of air upon the same to promote evaporation of the water, air-conduits traversing the vessel, and a body of liquid constituting a heat-transferring means between the air conduits and the walls of the vessel.

For a full understanding of my invention reference is made to the accompanying drawings showing one embodiment thereof, wherein—

Figure 1:
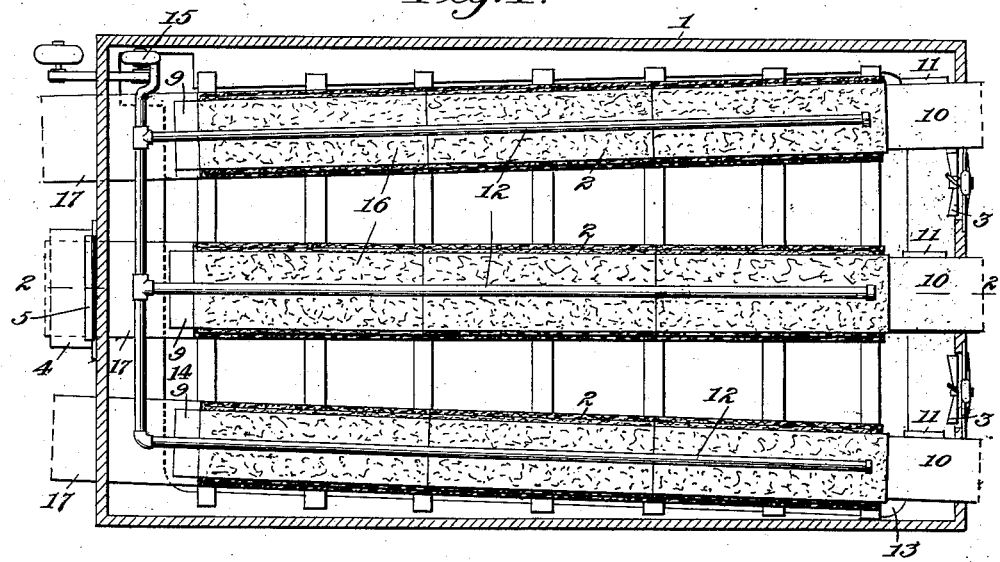
Figure 2:
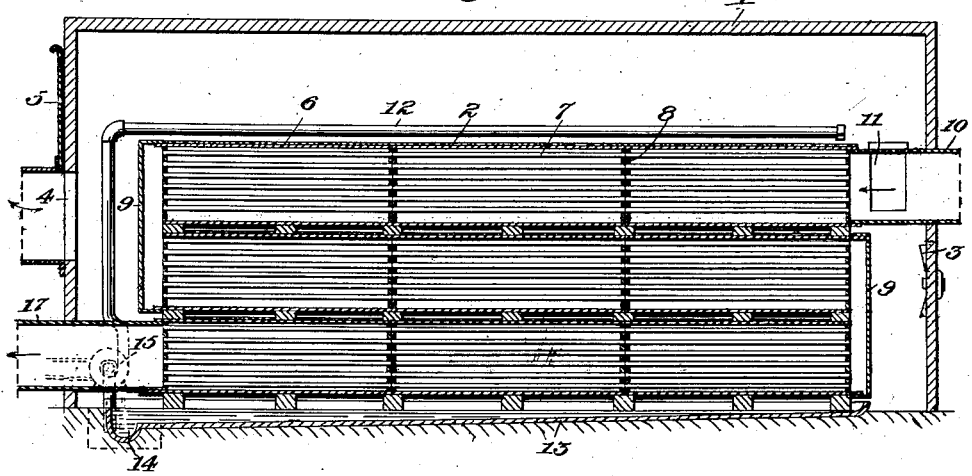

Figure 1 is a plan view of one type of cooler, Fig. 2 is a central vertical section of the same on line 2—2 of Fig. 1; and Fig. 3 is a transverse vertical section of a like construction of somewhat greater cooling capacity.

Referring to the drawings, 1 represents a casing suitably located with reference to the structure to be cooled, and usually in the upper portion of the same in order that the cool air may descend to the several rooms of the building as desired through flues provided for the purpose. Obviously a forced or positive draft or suction may be applied as required, or the cooling apparatus may be combined in any suitable manner with the ventilating system of the structure. Within the casing 1 I have shown a plurality of vessels 2, usually of metal as galvanized iron; as illustrated these vessels are nine in number and are disposed in three sets or series, each set comprising three superposed rectangular vessels decreasing progressively in horizontal diameter from the bottom to the top of the series. The series may diverge slightly from each other toward one end of the casing, in which I have shown fans 3—3 for directing a current of air upon the several vessels.

4 indicates the outlet for moisture-laden air from the casing, and 5 a damper for controlling the same.

Each vessel 2 is illustrated as comprising a number of open-ended abutting sections 6, each traversed by a suitable number of air-conduits 7, mounted in tube-sheets 8 forming a liquid-tight joint with the walls of the several sections. When the sections are mounted as shown the air-conduits form a substantially continuous tube extending from end to end of the vessel. The use of a number of these sections 6 enables an apparatus of any desired length to be constructed by simply multiplying the number of sections employed. As shown the apparatus is designed to subject the air to be cooled to the successive effect of the several vessels constituting each series, and for this purpose flues 9 are provided between the ends of adjacent vessels. Air-inlet flues 10 extend to a suitable source of supply of pure air, and are provided within the casing with a gate or damper 11, adapted for control from the exterior of the casing.

Above each series of vessels and extending centrally over the same I have indicated water-supply pipes 12 which may be perforated throughout their length. Below the vessels is a catch-basin 13, provided at one end with a transverse channel 14 leading to a well from which the excess water is returned by a pump 15 to the discharge pipes 12.

16 represents a covering of fabric, or other porous material, applied to the exterior surface of the several vessels, and serving to expose the water undergoing evaporation in the form of a thin film to the air.

The operation of the cooling system is as follows: The pump 15 is operated to discharge water over and upon the upper vessels of each series, whence it flows in a sheet or film over the several vessels, the excess being caught in the basin 13 and again discharged through the pipes 12. By means of the fans 3 air is projected upon and over the several vessels, and a rapid evaporation of the enveloping moisture is induced. According to the well known principles of evaporation a large amount of heat is rendered latent during this evaporation, and this heat is absorbed from the quiescent liquid contents of the several vessels 9, a rapid fall in the temperature of which will follow. This body of liquid serves not only as a means of transferring heat from the pipes through which the air passes to the walls of the containing vessels and thence to the air passing over the moist surfaces thereof but also, so to speak, as an accumulator of cold, the temperature of this body of water, in the operation of the device, being gradually lowered to a point at which it remains practically constant. There is therefore surrounding the air conduits a body of cold liquid sufficient in quantity to continuously absorb the heat from the air. In the meantime pure air to be supplied to the several rooms of the structure is caused to traverse the air-conduits 7 under natural or positive draft, and is rapidly cooled by transference of heat to the liquid surrounding the air-conduits. The cool and dry air passes by flues 17 to the flues of the building for distribution to the several rooms as required. In case it is desired to distribute cool air containing an increased proportion of moisture, this may be effected by opening one or all of the gates 11, thereby permitting the moisture-laden air from the interior of the casing 1 to pass into the air-conduits. At the same time the damper 5 may be wholly or partially closed, and by a suitable regulation of the dampers or gates 5, 11, any desired proportion of moisture may be introduced into the air traversing the air-conduits.

While I have illustrated a specific form and arrangement of cooling vessels, it will be understood that these will be adapted in number, arrangement and capacity to the particular purposes in view.

I claim:—

1. An air-cooling apparatus comprising a vessel adapted to contain liquid, means for supplying water to the exterior surface of said vessel, means for forcing a current of air against the same to promote evaporation of the water, open-ended conduits for air passing through said vessel, and flues for receiving and delivering air to and from the conduits.

2. An air-cooling apparatus comprising a vessel adapted to contain liquid, means for supplying water to the exterior surface of said vessel, means for forcing a current of air against the same to promote evaporation of water, open-ended conduits for air passing through said vessel, flues for receiving and delivering air to and from the conduits, and means for collecting water and a pump for forcing it back to the supply.

3. An air-cooling apparatus comprising a vessel adapted to contain liquid, porous material on the outside of the receptacle, means for supplying water thereto, means for forcing a current of air against the same to promote evaporation of water, open-ended conduits for air passing through said vessel, and flues for receiving and delivering air to and from the conduits.

4. An air-cooling apparatus comprising a vessel adapted to contain liquid, porous material on the outside of the receptacle, means for supplying water thereto, means for forcing a current of air against the same to promote evaporation of water, open-ended conduits for air passing through said vessel, flues for receiving and delivering air to and from the conduits and means for collecting water and a pump for forcing it back to the supply.

5. An air-cooling apparatus comprising a chamber, a vessel therein adapted to contain liquid, means for supplying water to the exterior of said vessel and for forcing a current of air against the same to promote evaporation, open-ended conduits for air passing through said vessel, flues for receiving and delivering air to and from the conduits, and a valve-controlled opening from the chamber into the receiving air-flue.

6. An air-cooling apparatus comprising a plurality of superposed vessels, a porous covering externally applied to each vessel, means for supplying water to the uppermost vessel and for directing a current of air upon the vessels to promote evaporation of the water, air conduits traversing said vessels, and air flues connecting said conduits.

7. An air-cooling apparatus comprising a plurality of superposed vessels of progressively increasing size, a porous covering externally applied to each vessel, means for supplying water to the uppermost vessel and returning excess water thereto, means for directing a current of air upon the vessels to promote evaporation of the water, air conduits traversing said vessels, and a body of liquid within each vessel surrounding said air conduits.

8. In an air-cooling apparatus, a vessel comprising a plurality of abutting watertight sections, open-ended air conduits in each of said sections, and tube sheets for supporting the conduits of adjacent sections.

In testimony whereof, I affix my signature in presence of two witnesses.

WILLIAM A. MERRALLS.

Witnesses:
C. P. TOWNSEND,
CHAS. H. POTTER.